United States Patent

Worley

[15] 3,640,548
[45] Feb. 8, 1972

[54] BICYCLE SADDLE BRACE

[72] Inventor: George W. Worley, Bolivar, Tenn.
[73] Assignee: Troxel Manufacturing Company, Moscow, Tenn.
[22] Filed: July 10, 1970
[21] Appl. No.: 53,865

[52] U.S. Cl..............................280/289, 248/164, 297/195
[51] Int. Cl. ........................................................B62j 1/00
[58] Field of Search ....................280/289, 202; 297/195, 18; D90/16, 8; 248/397, 164, 166

[56] References Cited

UNITED STATES PATENTS

| | | | |
|---|---|---|---|
| 2,987,109 | 6/1961 | Sohmer | 248/164 X |
| 3,144,270 | 8/1964 | Bilancia | 248/397 X |
| 3,416,837 | 12/1968 | Saunders | 297/195 |
| 3,486,727 | 12/1969 | Timms | 280/289 X |

Primary Examiner—Kenneth H. Betts
Attorney—John R. Walker, III

[57] ABSTRACT

A brace for supporting an elongated bicycle saddle or seat adjacent the rearward end thereof from a bicycle. The brace includes a pair of members which are attached adjacent the upper ends thereof to the saddle and adjacent the lower end thereof to a part of the bicycle. The members respectively have upper and lower portions that are substantially parallel with one another and the members have intermediate portions integrally interconnecting the upper and lower portions. The intermediate portions are disposed in crossed relationship and are fastened together with fastening means to provide a rigid and stable brace.

7 Claims, 3 Drawing Figures

PATENTED FEB 8 1972
3,640,548
FIG. 1
FIG. 2
FIG. 3
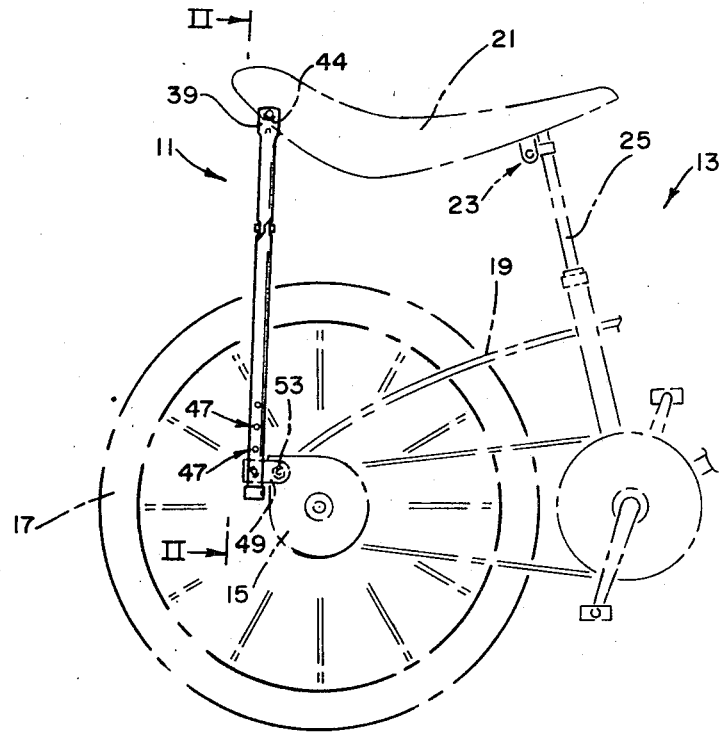
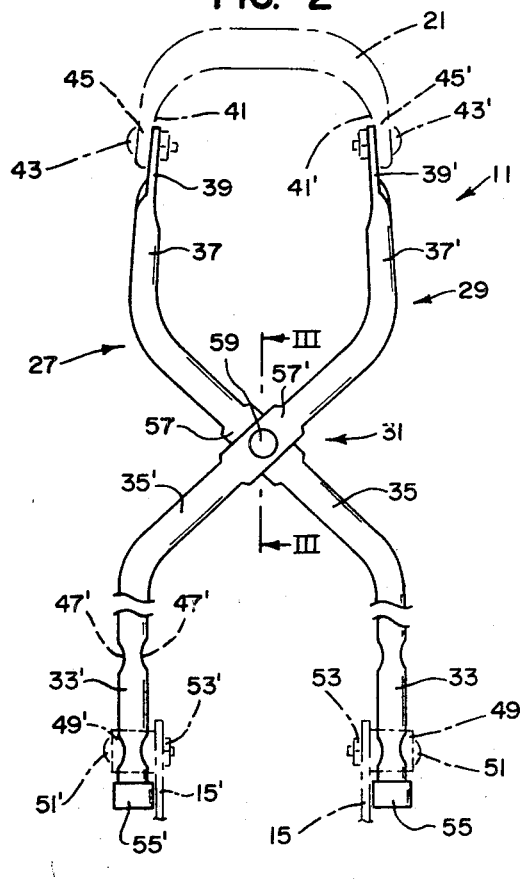
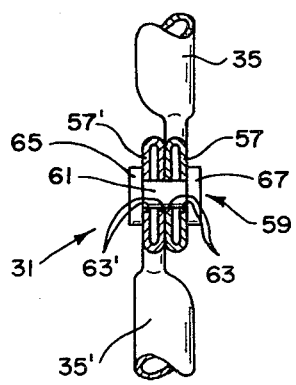
INVENTOR.
GEORGE W. WORLEY
BY John R. Walker, III
Attorney

BICYCLE SADDLE BRACE

BACKGROUND OF THE INVENTION

1. Field of the Invention

This invention relates to supports for elongated bicycle saddles or seats of the "Banana-seat" type.

2. Description of the Prior Art

Typical supports for elongated bicycle saddles or seats are inverted U-shaped braces having vertically extending parallel legs interconnected at the upper ends thereof by an upwardly extending arcuate bight portion that extends above the cycle saddle. There are certain disadvantages and safety hazards relative to the use of the above-mentioned inverted U-shaped brace. For example, there is the danger of riders hurting themselves by striking the upwardly extending bight portion when the riders attempt to mount or dismount from the saddles. Thus, there is the danger of the person's legs striking said bight portion. In addition, said bight portion encourages the dangerous practice of double riding since the second rider lulls himself into a false sense of security by utilizing said bight portion as a means of holding on. In other words, if there were no bight portion and nothing to hold on to, there would be no encouragement for double riding. One might surmise that an obvious solution to the above-mentioned problems is merely to eliminate this bight portion. However, with the elimination of the bight portion, which would leave two vertically extending spaced apart braces without any interconnection, another problem would be created in that there would be lack of stability of the rearward end of the cycle saddle, and it would tend to sway, thereby causing the possibility of the rider losing his balance and being thrown from the bicycle.

SUMMARY OF THE INVENTION

The present invention is directed towards overcoming the heretofore-mentioned and other disadvantages and problems in prior supports for elongated bicycle seats or saddles. The concept of the present invention is to eliminate all projections of the brace above the cycle saddle and yet provide a brace which is rigid and stable. Thus, with the use of the brace of the present invention, safety is provided whereby the rider can simply slip his leg off or onto the saddle and over the rearward part thereof without any difficulty. Also, there is no encouragement for double riding, and there is rigidity and stability of the cycle saddle during the riding and during mounting and dismounting. Applicant accomplishes the above-mentioned concept by providing a brace which includes a pair of crossed members that are attached adjacent the upper ends thereof to the saddle and adjacent the lower ends thereof to a portion of the bicycle. The members respectively have upper and lower portions that are substantially parallel with one another and the members have intermediate portions integrally interconnecting the upper and lower portions, with the intermediate portions being in crossed relationship and being fastened together with fastening means to provide a rigid and stable brace.

BRIEF DESCRIPTION OF THE DRAWINGS

FIG. 1 is a fragmentary view of the rearward portion of a bicycle incorporating the saddle brace of the present invention.

FIG. 2 is an enlarged rear elevational view of the saddle brace.

FIG. 3 is a further enlarged fragmentary sectional view taken as on the line III—III of FIG. 2.

DESCRIPTION OF THE PREFERRED EMBODIMENT

The saddle brace 11 of the present invention is shown mounted on the rearward portion of a typical bicycle 13 in FIG. 1 wherein it will be seen that the bicycle 13 includes the usual support structures 15, 15', on either side of the rear wheel 17 adjacent the central portion thereof and which are usually preformed platelike members that are integrally attached to the bicycle frame 19. It will be understood that saddle brace 11 is intended for use in supporting an elongated saddle or seat 21 which the assignee of the present invention and others manufacture and which said assignee refers to its seat by the trademark "Banana-Seat." Thus, when the term "elongated bicycle saddle" or "elongated bicycle seat" is used in the present application, it is deemed to mean that particular type of seat or saddle illustrated and others similar to it and which is referred to by the name "Banana-Seat," among other names. Additionally, seat 21 is of the type having a forward clamping assembly 23 fixed adjacent the forward part of seat 21 to the usual adjustment post 25.

The following is a description of the present invention and its relationship to the heretofore-described typical bicycle 13. Saddle brace 11 includes in general a first member 27, a second member 29, and fastening means 31. First member 27 is preferably formed of a single piece of tubing which is bent in the form best seen in FIG. 2 to establish a first lower portion 33, which in the in-use position extends substantially vertically, a first intermediate portion 35 extending angularly upwardly and laterally from its integral attachment with the upper end of first lower portion 33, and a first upper portion 37 that extends substantially vertically upwardly from its integral attachment with the upper end of first intermediate portion 35. Stated another way, first upper portion 37 is substantially parallel with first lower portion 33 but laterally offset to one side thereof and with first intermediate portion 35 integrally joining first upper portion 37 and first lower portion 33 and being at an angle relative thereto. It will be noted that although first upper portion 37 is substantially parallel with first lower portion 33, the first upper portion angles slightly inwardly, as best seen in FIG. 2 so that when in use, the upper end 39 of first upper portion 37 is disposed adjacent the left inward side 41 of seat 21 where it is adapted to be attached by suitable upper attachment means such as a rivet or the bolt-nut assembly 43 extending through an aperture 44 in the upper end 39 and through an aperture not shown in the flange 45 of seat 21. The upper end 39 of first member 27 is preferably flattened, as best seen in FIGS. 1 and 2. With the upper end 39 attached to seat 21, as above-described, first lower portion 33 will be disposed adjacent the support structure 15 on the right side of the bicycle.

First lower portion 33 is preferably adjustably attached to support structure 15 by a suitable lower attachment means, and preferably by the means disclosed in U.S. Pat. No. 3,486,727 owned by the assignee of the present application. Thus, first lower portion 33 is preferably provided with a plurality of vertically spaced pairs of transversely aligned apertures 47 (only one of each pair being shown in FIG. 1). A clip 49 like that disclosed in said U.S. Pat. No. 3,486,727 is provided around first lower portion 33 and a bolt 51 extends through a selected pair of apertures 47 and through an aperture, not shown, in support structure 15 where it is secured by means of a nut, not shown, engaged on bolt 51. A nut-bolt assembly 53 in the manner shown in said patent, fixedly attaches clip 49 to support structure 15. A cap 55, formed of rubber, plastic, or the like, is respectively removably fitted on the lower end of first lower portion 33.

Second member 29 is substantially identical to first member 27 and the parts of second member 29 corresponding to those of first member 27 have been identified with like numerals with the addition of the prime mark thereon and the corresponding parts are identified verbally by the use of the word "second" in place of "first." For example, second intermediate portion 35' of second member 29 corresponds with first intermediate portion 35 of first member 27. Thus, second member 29 and its related parts includes the following parts in addition to second intermediate portion 35': Second lower portion 33', second upper portion 37', upper end 39', right inward side 41' of seat 21, bolt-nut assembly 43', flange 45', pairs of apertures 47' (not shown), clip 49', bolt 51', nut 53', and cap 55'.

In use, second member 29 is turned around or disposed oppositely from first member 27, that is, second lower portion 33' is attached to the left support structure 15' and extends upwardly in spaced parallel relationship to first lower portion 33 and thence second intermediate portion 35' extends angularly upwardly and laterally to the right from second lower portion 33' where it crosses first intermediate portion 35, and second upper portion 37' extends upwardly in spaced substantially parallel relationship to first upper portion 37 (but angles slightly inwardly) where it extends to the right inward side 41' of seat 21 and is attached thereto by the bolt-nut means 43'. The first and second intermediate portions 35, 35' cross at a place intermediate the respective upper and lower ends of the intermediate portions 35, 35' where they are preferably respectively flattened as at 57, 57'. The flattened portions 57, 57' are preferably in flat face-to-face engagement as best seen in FIG. 3 and are fastened together by fastening means 31. Fastening means 31 comprises any suitable fastening means, as a nut-bolt assembly, or preferably rivet 59 having a reduced portion 61 extending through aligned apertures 63, 63' respectively in flattened portions 57, 57' with the rivet having enlarged head portions 65, 67 on opposite ends of the reduced portion 61.

From the foregoing, it will be understood that a very rigid and stable saddle brace 11 is provided which does not obstruct seat 21 above or along the sides thereof whereby the rider can slip easily off and on the back of the saddle 21.

Although the invention has been described and illustrated with respect to a preferred embodiment thereof, it is to be understood that it is not to be so limited since changes and modifications may be made therein which are within the full intended scope of this invention.

I claim:

1. In a bicycle of the type including an elongated saddle supported adjacent the forward end thereof from said bicycle and including support structure adjacent the center of the bicycle wheel; a brace for supporting said saddle adjacent the rearward end thereof comprising a first member including a first upper portion, a first lower portion and a first intermediate portion interconnecting said first upper portion and first lower portion; a second member including a second upper portion, a second lower portion and a second intermediate portion interconnecting said second upper portion and said second lower portion; said first and second members being disposed with said first and second lower portions extending in spaced parallel relationship to one another, with said first and second intermediate portions extending at an angle relative to said upper and lower portions and extending in crossed relationship to each other, and with said first and second upper portions extending substantially in spaced parallel relationship with one another, fastening means engaging said first and second intermediate portions where said first and second intermediate portions cross for fastening said first and second members together, upper attachment means attaching said upper portions respectively to opposite sides of said saddle, and lower attachment means attaching said lower portions respectively to said support structure adjacent the center of the bicycle wheel.

2. The apparatus of claim 1 in which the upper ends of said upper portions are respectively flattened and extend to the opposite inward sides of the saddle.

3. The apparatus of claim 1 wherein said intermediate portions are respectively flattened where said intermediate portions cross and are in flat face-to-face engagement.

4. In a bicycle of the type including an elongated saddle having depending right and left flanges and being supported adjacent the forward end thereof and including right and left support structure adjacent the center of the bicycle wheel; a brace for supporting said saddle adjacent the rearward end thereof comprising a first tubular member including a first lower portion, a first upper portion, and a first intermediate portion integrally interconnecting said first lower portion and said first upper portion; first lower attachment means adjustably attaching said first lower portion to said right support structure; said first lower portion extending substantially vertically upwardly from said first lower attachment means, said first intermediate portion extending upwardly and to the left from the upper end of said first lower portion and said first upper portion extending substantially vertically upwardly to the left-hand inside surface of said seat, first upper attachment means attaching said first upper member to the left side of said saddle; a second tubular member including a second lower portion, a second upper portion, and a second intermediate portion integrally interconnecting said second lower portion and said second upper portion; second lower attachment means adjustably attaching said second lower portion to said left support structure; said second lower portion extending substantially vertically upwardly from said second lower attachment means, said second intermediate portion extending upwardly and to the right from the upper end of said second lower portion and said second upper portion extending substantially vertically upwardly to the right-hand inside surface of said seat, second upper attachment means attaching said second upper member to the right side of said saddle; said first and second intermediate portions being flattened intermediate the ends thereof and crossing at said flattened portions, said flattened portions being in flat face-to-face engagement, and fastening means engaging said flattened portions for fastening said first and second members together.

5. A brace for supporting the rearward end of an elongated bicycle saddle from a bicycle comprising a first member including a first upper portion, a first lower portion, and a first intermediate portion interconnecting said first upper portion and said first lower portion; a second member including a second upper portion, a second lower portion and a second intermediate portion interconnecting said second upper portion and said second lower portion; said first and second members being disposed with said first and second lower portions extending in spaced parallel relationship with one another, with said first and second intermediate portions extending at an angle relative to said upper and lower portions and extending in cross relationship to each other, and with said first and second upper portions extending in spaced substantially parallel relationship with one another, fastening means engaging said first and second intermediate portions where said first and second intermediate portions cross for fastening said first and second members together, first and second upper attachment means for attaching said upper portions respectively to opposite sides of the saddle of a bicycle, and first and second lower attachment means for attaching said lower portions respectively to support structure adjacent the center of the bicycle wheel.

6. The apparatus of claim 5 in which the upper ends of said upper portions are respectively flattened and extend to the opposite inward sides of the saddle.

7. The apparatus of claim 5 wherein said intermediate portions are respectively flattened where said intermediate portions cross and are in flat face-to-face engagement.

* * * * *